(12) United States Patent
Martin

(10) Patent No.: US 10,786,098 B1
(45) Date of Patent: Sep. 29, 2020

(54) METHOD AND APPARATUS FOR ALIGNING MULTIPLE PICTURES ON A WALL

(71) Applicant: Shane Theodore Martin, Lancaster, PA (US)

(72) Inventor: Shane Theodore Martin, Lancaster, PA (US)

(*) Notice: Subject to any disclaimer, the term of this patent is extended or adjusted under 35 U.S.C. 154(b) by 0 days.

(21) Appl. No.: 16/832,698

(22) Filed: Mar. 27, 2020

Related U.S. Application Data

(60) Provisional application No. 62/831,630, filed on Apr. 9, 2019.

(51) Int. Cl.
*A47G 1/24* (2006.01)
*G01B 5/25* (2006.01)
*A47G 1/06* (2006.01)

(52) U.S. Cl.
CPC ............... *A47G 1/24* (2013.01); *A47G 1/065* (2013.01); *G01B 5/25* (2013.01)

(58) Field of Classification Search
CPC . A47G 1/24; A47G 1/065; G01B 5/25; G01B 3/14
See application file for complete search history.

(56) References Cited

U.S. PATENT DOCUMENTS

| | | | |
|---|---|---|---|
| 1,553,472 A * | 9/1925 | Pevovarchuk | A47G 1/065 40/735 |
| 1,787,541 A * | 1/1931 | Meyer | A47G 1/065 40/732 |
| 2,263,629 A * | 11/1941 | Jacoby | A47G 1/065 40/730 |
| 2,839,320 A * | 6/1958 | Hill | F16B 7/04 403/172 |
| 2,973,584 A * | 3/1961 | Snapp | E04F 21/0015 33/194 |
| 3,648,393 A | 3/1972 | Parrilla | |
| 3,673,723 A | 7/1972 | Lazar et al. | |
| 3,673,724 A | 7/1972 | Bell et al. | |
| 4,443,949 A * | 4/1984 | Newton | A47G 1/205 248/498 |
| 4,497,125 A | 2/1985 | Hutchinson | |
| 4,608,770 A | 9/1986 | Gray | |
| 4,712,322 A | 12/1987 | Rubin | |
| 4,912,863 A * | 4/1990 | Harvey | A47G 1/065 40/730 |
| 4,964,231 A | 10/1990 | De Maat et al. | |
| 5,076,612 A | 12/1991 | Nirmel | |

(Continued)

FOREIGN PATENT DOCUMENTS

GB 2522694 A 8/2015

*Primary Examiner* — Gary C Hoge
(74) *Attorney, Agent, or Firm* — Patent Law Associates

(57) ABSTRACT

A user-configurable template assembly for aligning a plurality of pictures or other objects on a surface comprising a plurality of elongate guide members and a plurality of connector members. Each connector member is configured to engage an end of one or more guide members and maintain the plurality of guide members in an orthogonal array. The template array is ideally configured to align commonly sized pictures in a decorative manner. The guide members and connectors incorporate standardized interface connections providing interchangeability in parts and maximizing template array assembly options.

12 Claims, 3 Drawing Sheets

(56) References Cited

U.S. PATENT DOCUMENTS

| | | | |
|---|---|---|---|
| 5,172,504 A | 12/1992 | De Maat et al. | |
| 5,463,817 A * | 11/1995 | Leeds | G01C 9/20 33/371 |
| 5,620,764 A | 4/1997 | Schwarz et al. | |
| 5,692,357 A * | 12/1997 | McCain | B25B 11/02 33/194 |
| 6,045,639 A | 4/2000 | Davis | |
| 6,116,437 A * | 9/2000 | Rowe | F28D 1/04 211/119.008 |
| 6,338,215 B1 | 1/2002 | Vincent | |
| 6,449,863 B1 * | 9/2002 | Voorhees | A47G 1/205 248/495 |
| 6,490,818 B1 | 12/2002 | Bramhall et al. | |
| 6,553,683 B1 * | 4/2003 | Klass | E04F 21/0076 33/1 AP |
| 6,618,955 B2 * | 9/2003 | Rice | A47G 1/205 33/1 B |
| 6,880,259 B1 * | 4/2005 | Schultz | A47G 1/205 33/1 G |
| 7,421,796 B1 * | 9/2008 | DeAngelis-Morris | A47G 1/205 33/1 B |
| 7,814,675 B2 * | 10/2010 | Venderley | A47G 1/205 33/613 |
| 8,087,180 B1 * | 1/2012 | Clayton | A47G 1/205 33/613 |
| 8,327,567 B2 | 12/2012 | Swick et al. | |
| 8,333,026 B2 | 12/2012 | Southard | |
| 9,032,637 B2 * | 5/2015 | Propp | B25H 7/04 33/613 |
| 9,311,836 B1 | 4/2016 | Van Der Walde | |
| 9,462,900 B2 * | 10/2016 | Esposito | A47G 1/205 |
| 9,532,670 B2 | 1/2017 | Vaessen et al. | |
| 9,687,091 B2 | 6/2017 | Jhagroo | |
| 9,717,353 B1 | 8/2017 | Borra | |
| 10,417,684 B2 * | 9/2019 | Pearce | G06Q 30/0643 |
| 2003/0141012 A1 | 7/2003 | Ketterer | |
| 2013/0032552 A1 | 2/2013 | Flatin | |
| 2016/0343157 A1 | 11/2016 | Riggione et al. | |
| 2017/0200286 A1 | 7/2017 | Brahmanapalli et al. | |

\* cited by examiner

METHOD AND APPARATUS FOR ALIGNING MULTIPLE PICTURES ON A WALL

CROSS-REFERENCE TO RELATED APPLICATIONS

This application claims the benefit of priority of U.S. Provisional Application 62/831,630 filed Apr. 9, 2019.

BACKGROUND OF THE INVENTION

This invention relates generally to tools for aligning pictures or other visual objects on a wall, and, more particularly to a user-configurable template for aligning a plurality of pictures, artwork, or other visual objects for attachment to a wall in a user-configurable pattern.

The task of hanging multiple pictures on a wall while maintaining uniform spacing between the pictures, levelling each picture, or arranging the pictures in a pattern more visually interesting than a simple horizontal/vertical array becomes increasingly complicated as the number of pictures increases. Visualizing patterns may also require at least a few of the pictures to be positioned on the wall. If a user wishes to begin with a new pattern, wall repairs may then be necessary for the pictures hung during the initial pattern attempt.

An improved system and method for aligning for a plurality of pictures on a display surface addressing the above-mentioned shortcomings would be inherently useful.

SUMMARY OF THE INVENTION

Accordingly, the present invention, in any of the embodiments described herein, may provide one or more of the following advantages:

It is an object of the present invention to provide a user-configurable template assembly that may be used to align a plurality of pictures or other objects on a display surface in a user-defined pattern. The template assembly is ideally configured to align common-size pictures such as 4-inch×6-inch, 5-inch×7-inch, 8-inch×10-inch, or 10-inch×13-inch, in a decorative manner.

It is a further object of the present invention to provide a user-configurable template assembly that may be used to align a plurality of pictures or other objects on a display surface without the need to level each picture individually. The template assembly is leveled when placed on the display surface thereby providing a plurality of positioning guides for individual pictures that are level. The template assembly may be temporarily secured to the display surface by nails, adhesives, or the like.

It is a still further object of the present invention to provide a user-configurable template assembly for aligning a plurality of pictures or other objects on a mounting surface that is easily reconfigured to provide a plurality of picture alignment configurations. The alignment template assembly comprises a plurality of elongate guide members and a plurality of connector members, each connector member configured to engage one or more guide members and maintain the guide members in an orthogonal array. Guide members of various lengths may be provided to enable the template assembly to define a plurality of various sized and positioned guides for hanging pictures in the template array. Guide members may further include rule markings to assist in placement of fasteners and the like needed to attach the pictures to the wall or to assist in alignment of pictures sizes that do not precisely match the available guide member lengths.

It is a further object of the present invention to provide a user-configurable template assembly for aligning a plurality of pictures or other objects on a surface comprising a plurality of elongate guide members and a plurality of connector members wherein each guide member and connector member has a consistent connection interface. Opposing ends of each guide member are each configured to interface with one of a plurality, preferable 4, receptacles provided on each connector member.

It is a still further object of the present invention to provide a user-configurable template assembly for aligning a plurality of pictures or other objects on a surface that is durable in construction, inexpensive of manufacture, carefree of maintenance, easily assembled, and simple and effective to use.

These and other objects are achieved in accordance with the present invention by providing a user-configurable template assembly for aligning a plurality of pictures or other objects on a surface comprising a plurality of elongate guide members and a plurality of connector members. Each connector member is configured to engage an end of one or more guide members and maintain the plurality of guide members in an orthogonal array. The template array is ideally configured to align commonly sized pictures in a decorative manner. The guide members and connectors incorporate standardized interface connections providing interchangeability in parts and maximizing template array assembly options.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
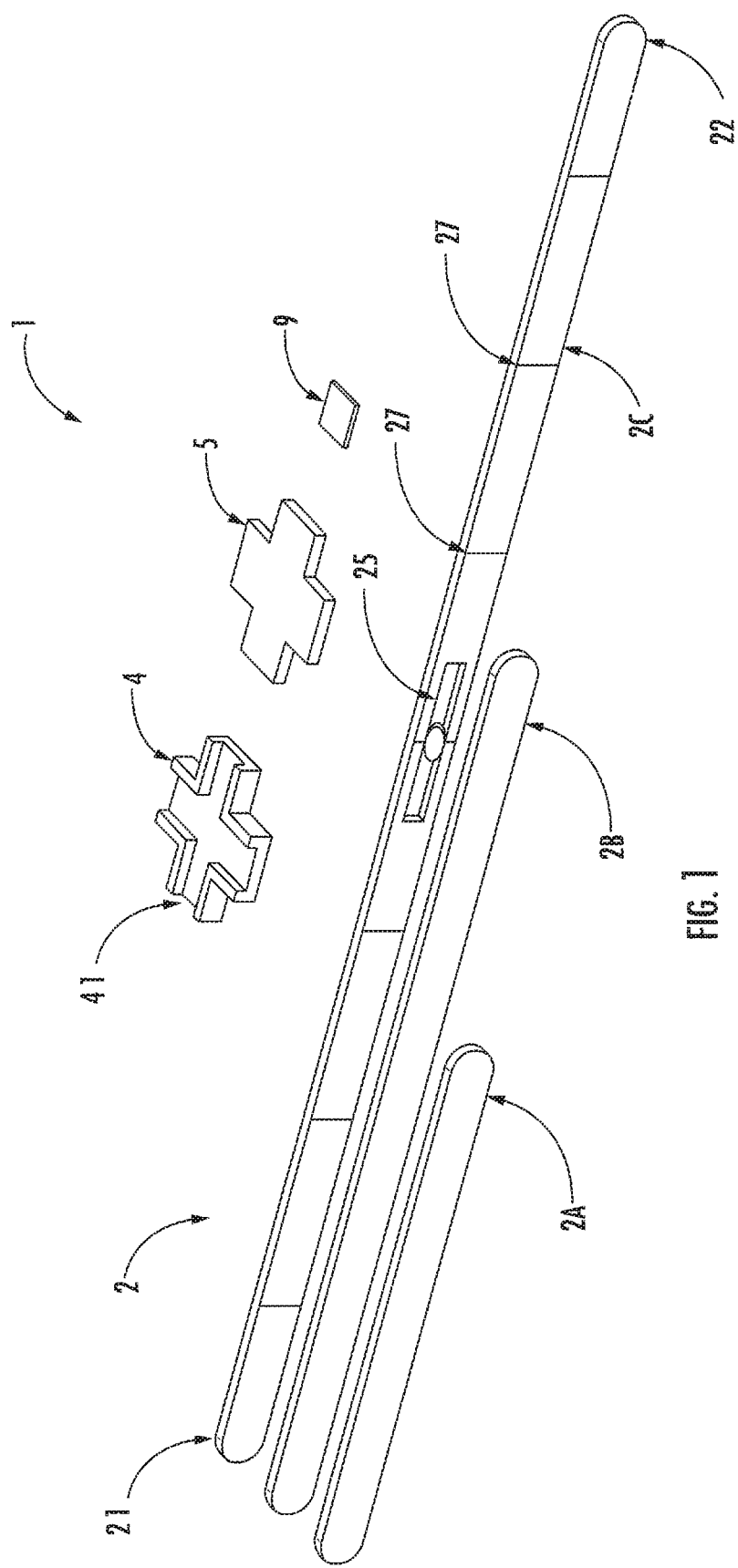
FIG. 1 is a view of the elements on one embodiment of template assembly of the present invention.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience and are determined as the frame assembly would normally be positioned for use on a vertical planar surface. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all figures.

Referring to the figures, an exemplary alignment template assembly 1 is shown comprising elongate guide members 2, a connector member 4, and an attachment means 9 for temporarily securing the template assembly 1 to a display surface for use. The template assembly is assembled by joining a plurality of guide members using the connector members 4 into a user-defined pattern. Each connector member is configured to receive an end of at least one guide member 2. Each connector member 4 is preferably configured to receive an end of four guide members in an orthogonal alignment. The interface between the connector member and the guide members is uniform for all components of the assembly to provide interchangeability of parts and virtually unlimited expansion of the template assembly.

The connector member 4 may be configured to retain interfacing guide members 2 in engagement therewith when the first and second portions are assembled into a unitary assembly. The connector member 4 may comprise a unitary construct or may include a second portion 5 to restrain the guide members in engagement with the connector members and facilitate assembly and disassembly of the template assembly.

Figure 2:
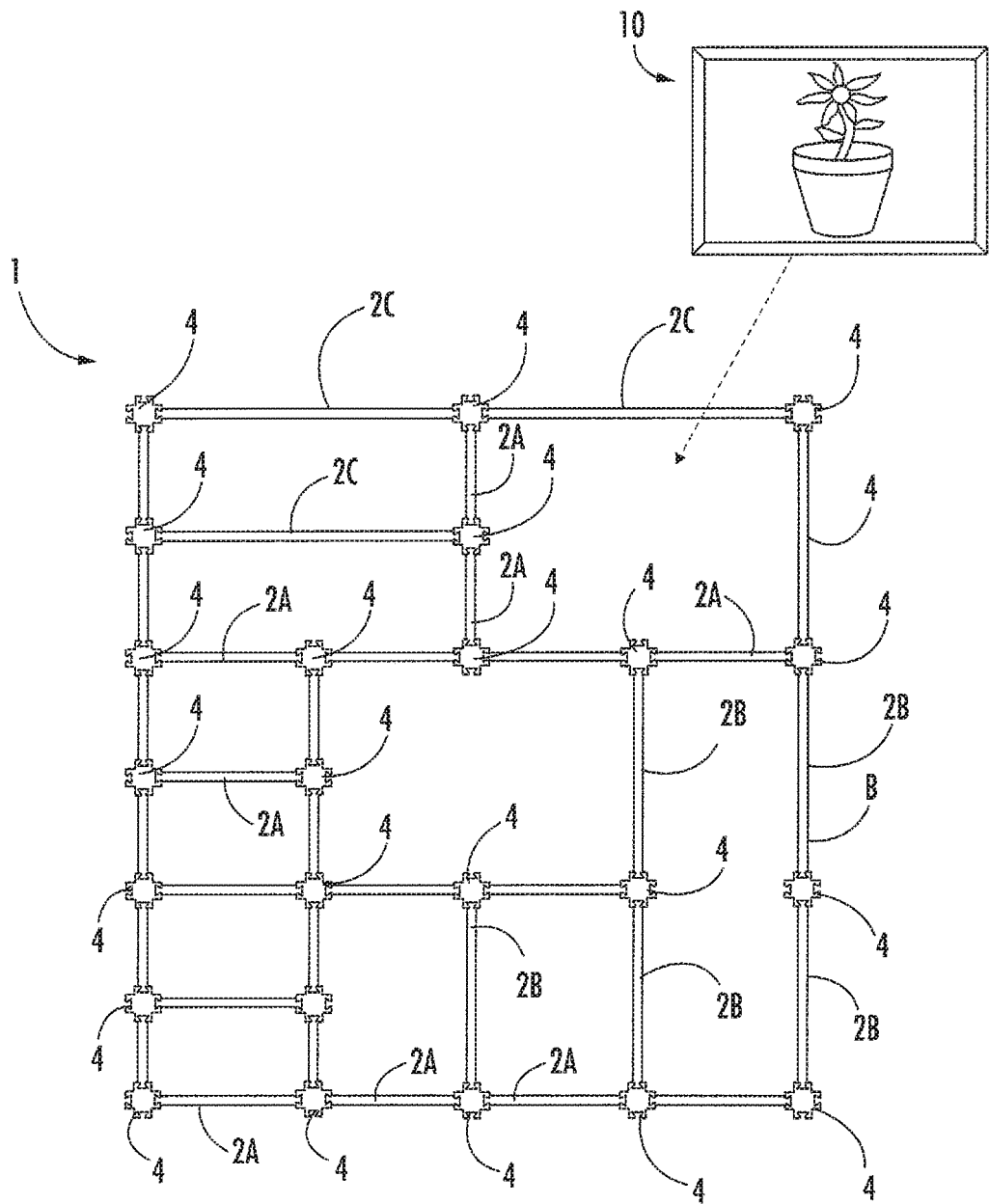
FIG. 2 provides a view of a first assemblage of the invention as intended for use.

Referring to FIG. 2, it is envisioned that a template assembly 1 of approximately three feet by five feet would provide ample flexibility. Packaging of the assembly 1 for retail sale may include enough guide members and connector members 4,5 to assemble a template assembly of this size. Guide members of various lengths 2A, 2B, 2C are preferably provided to permit creation of template arrangements that vary beyond a uniform array of like-sized openings. Guide members of additional lengths may be included (e.g., four or more set lengths) for additional flexibility in the template design. Multiple packages may also be combined to create templates covering larger areas.

The template assembly 1 may comprise a border frame defining an outer perimeter inside of which the guide members and connector members may be assembled to define a desired alignment pattern. The border frame improves structural stability of the template assembly. The preferred perimeter configuration is rectangular.

The template assembly is ideally configured to align common-size pictures such as 4-inch×6-inch, 5-inch×7-inch, 8-inch×10-inch, or 10-inch×13-inch, in a decorative manner. Internal dimensions of individual position openings in the template array should permit common pictures sizes to be positioned therein without interference. The position openings defined by the guide members assist in aligning pictures 10 or other decorations on a wall or surface to create a mosaic.

The connector member 4 interface with the guide members 2 may permit interface in one of multiple positions to permit minor adjustment of the opening defined by proximate guide members 2. Orthogonal orientation of the guide members 2 is preferred. Such flexibility enables template configurations that accommodate framed and frameless pictures.

As illustrated, the connector member 4 includes four interface positions perpendicular oriented to each other. Connector members having two interface positions disposed 180 degrees apart may be provided to join guide members to create a longer span without projecting into the guide perimeter. Similarly, connector members having two interface positions disposed at a 90-degree orientation defines a dedicated corner connector member.

The guide members 2 may be marked with measuring scales or hash marks 27 to facilitate placements of pictures smaller than the minimum template opening or multiple small pictures within a template opening.

A leveling means, such as a spirit level 25, electronic sensor, or even a smart phone, may be provided with the assembly to facilitate alignment of the template assembly on the display surface. The leveling means may be incorporated into one or more of the guide members or may be selectively attachable to a guide member.

Internal frames and sizes may be varied to create various shapes and designs within a larger frame or area.

The template assembly 1 may be provided means for temporary fixture to display surface using nails, tacks, or the like. Alternatively, adhesive means 9 may be used to reduce or eliminate potential damage to the display surface caused by mounting the template assembly thereon.

Mounting pictures 10 on the display surface is by conventional means. The template assembly is not a substitute mounting means for the pictures.

The template assembly 1 preferably comprises a lightweight, sturdy, and durable material(s) of construction. Metals, plastics, and composites are contemplated.

Figure 3:
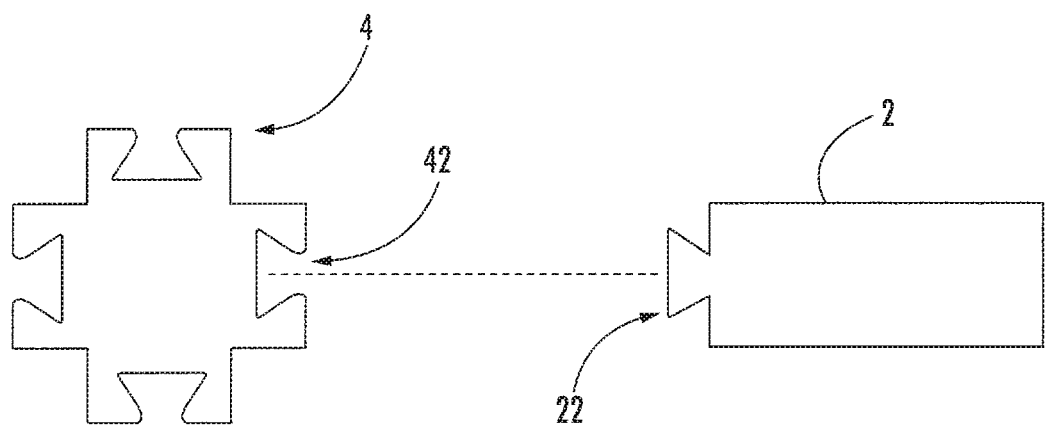
FIG. 3 illustrates a first embodiment of a connection detail between guide and connector members.
Figure 4:
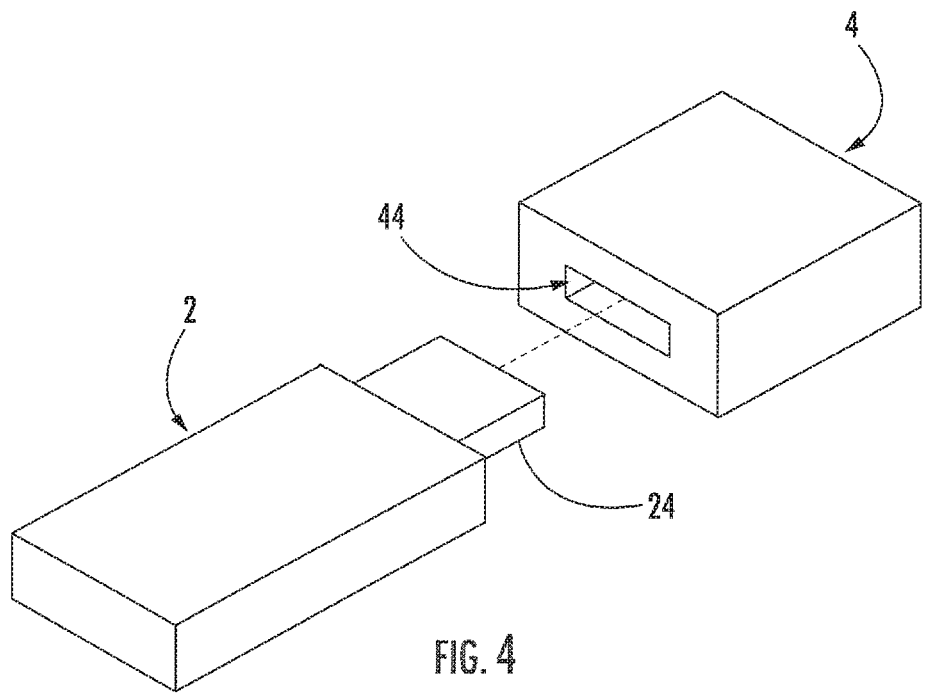
FIG. 4 illustrates a second embodiment of a connection detail between guide and connector members.

The connection between the guide members 2 and connectors includes a receptacle formed in the connector into which an end portion of the guide member is inserted. The interface between the receptacle and end portion preferably produces a friction fit to minimize relative movement once coupled. A first embodiment is illustrated in FIG. 1 in which the end portion 21 is a continuation of the guide member and the corresponding receptacle 41 in the connector is a channel configured to frictionally receive the end portion 21. A cover 5 may be provided to trap the end portions 21 in the receptacles and inhibit disengagement. A second embodiment is illustrated in FIG. 3 wherein the end portion 22 and receptacle 42 are configured as a dovetail joint. A third embodiment is illustrated in FIG. 4 wherein the receptacle 44 and the end portion 24 are configured as a mortise and tenon. In all embodiments, the interior surface of the receptacle frictionally engages the exterior surface of the end portion to retain the guide member to the connector in a generally fixed arrangement. The friction fit should be sufficiently tight to maintain the connection while still allowing a user to disengage the guide member from the connector without damage to either.

The purpose of template assembly is to ensure finished design of the plurality of pictures positioned on the display surface that is visually appealing and level without having to level and align each individual frame or photo.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A modular alignment tool for arranging a plurality of objects on a surface comprising:
an elongate guide member having opposed first and second ends defining a guide axis therebetween, each end having a connector fixture, the guide member further including a visual alignment guide; and a connector having a plurality of receptacles, each receptacle configured to receive the first end connection fixture on the guide member and fixedly couple the guide member and the connector;

a plurality of the guide members being connected by a plurality of the connectors, the visual alignment guides of the plurality of guide members defining one or more peripheral boundaries within which to position the plurality of objects into a mosaic arrangement for attachment to the surface.

2. The alignment guide of claim 1, wherein the visual alignment guide is a straight edge extending parallel to the guide axis.

3. The alignment guide of claim 2, wherein the visual alignment guide further comprises indicia denoting length measures along the guide member.

4. The alignment tool of claim 1, wherein the plurality of receptacles each comprise an interior surface and each connector fixture comprises an exterior surface, the interior surfaces configured to frictionally receive the exterior surfaces.

5. The alignment tool of claim 1, wherein the guide members comprise one or more groups of guide members, each group defined by the length of the guide members therein.

6. The alignment tool of claim 1, further comprising a visual indicator of alignment between the guide axis and a horizontal axis or a vertical axis.

7. A modular alignment tool for arranging a plurality of objects on a surface comprising:

an elongate guide member having opposed first and second ends and a visual alignment guide; and a connector having a plurality of receptacles, each receptacle configured to receive one of the ends of the guide member and fixedly couple the guide member and connector;

the alignment tool comprising a plurality of the guide members connected by a plurality of the connectors to define, by the visual alignment guides, one or more peripheral boundaries to guide positioning the plurality of objects into a mosaic arrangement for attachment to the surface.

8. The alignment tool of claim 7, wherein the plurality of receptacles each comprise an interior surface and each connector fixture comprises an exterior surface, the interior surfaces configured to frictionally receive the exterior surfaces.

9. The alignment tool of claim 8, wherein the guide members comprise one or more groups of guide members, each group defined by the length of the guide members therein.

10. The alignment tool of claim 9, further comprising a visual indicator of alignment between the visual alignment guide and a horizontal axis or a vertical axis.

11. A method for aligning a plurality of objects in a mosaic arrangement on a surface comprising the steps of:

providing a plurality of elongate guide members each having opposed first and second ends defining a guide axis therebetween, each end having a connector fixture;

providing a plurality of connectors, each connector having a plurality of receptacles, each receptacle configured to receive one of the ends of the one of the guide members and couple the guide member and connector;

connecting the plurality of the guide members to the plurality of connectors to create an alignment tool defining one or more peripheral boundaries, the one or more peripheral boundaries defining a mosaic pattern;

securing the alignment tool to the surface;

positioning the plurality of objects within respective one or more peripheral boundaries and securing the plurality of objects to the surface in the mosaic pattern; and removing the alignment tool from the surface.

12. The method of claim 11, further comprising the steps of:

providing one or more groups of guide members, each group defined by the length of the guide members therein; and assembling the alignment tool using guide members from each of the one or more groups such that the one or more peripheral boundaries have different sizes.

* * * * *